*T. Ashcraft,*

*Cotton Press.*

N°. 6,158. Patented Mar. 6, 1849.

UNITED STATES PATENT OFFICE.

THOMAS ASHCRAFT, OF RANDOLPH COUNTY, ALABAMA.

IMPROVEMENT IN COTTON-PRESSES.

Specification forming part of Letters Patent No. 6,158, dated March 6, 1849.

*To all whom it may concern:*

Be it known that I, THOMAS ASHCRAFT, of the county of Randolph and State of Alabama, have invented certain new and useful Improvements in Cotton-Presses, of which the following is a full and exact description, reference being had to the annexed drawings of the same, making part of this specification, in which—

Figure 3:
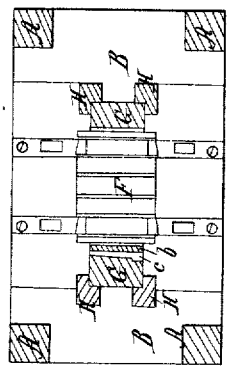
Figure 2:
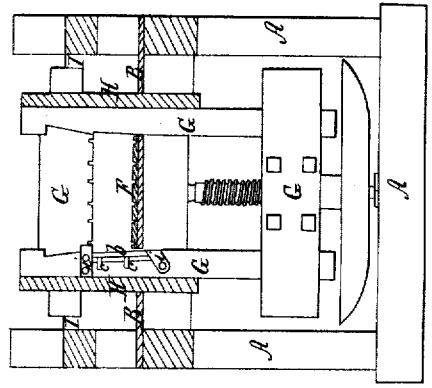
Figure 1:
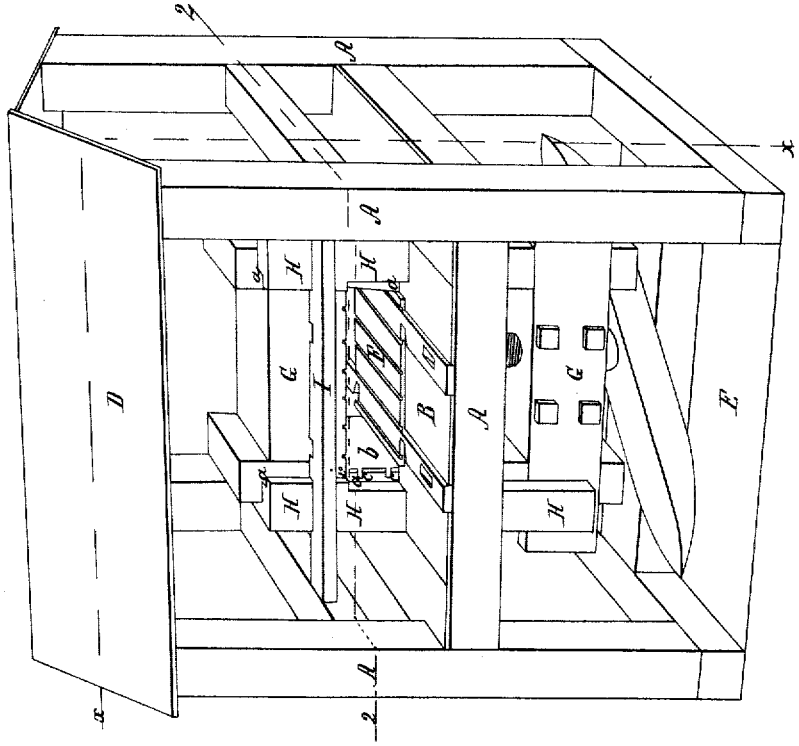

Figure 1 is a perspective view of the machine, with the several parts in the position they would respectively occupy when a bale of cotton had been compressed, and the sides of the box removed preparatory to taking it out. Fig. 2 is a vertical section taken through the line $x\ x$ of Fig. 1. Fig. 3 is a horizontal section through the line 2 2 of Fig. 1.

The same letters of reference indicate the same parts in all the figures.

In the accompanying drawings, A represents the frame of the house which incloses the press; B, the floor of the second story; D, the roof; E being the ground or lower story, in which the screw and the lever by which it is turned are placed. The platen F of this press is made stationary, and is secured to the floor-timbers, a pivot projecting from its under side, which enters a corresponding cavity in the upper end of the screw, which is kept full of oil to lessen the friction. In the lower end of the screw a pivot is secured, which rests in a footstep, made in the usual or in any suitable manner. The body and thread of the screw may be made of the usual dimensions, and the thread may be made in any of the common forms; but I prefer a thread whose transverse section corresponds in shape with the axial section of a truncated cone, with moderately-inclined sides, and whose base is about equal to its height.

The press-box consists of a strong rectangular frame, G, which slides up and down between the fender-posts H, its sides passing through the floor at either end of the platen. The lower beam of the frame of the press-box has a nut either formed in its substance or firmly secured in it, through which nut the screw turns to elevate and lower the frame. The fender-posts H are held in place by means of the floor-timbers and the beams I, which connect the opposite ends of the frame of the building. When the frame is elevated to the highest point, boards are placed in rabbets $a$ in the fender-posts, in the usual manner, to close the sides of the box, except a space above the beam I, through which the cotton is introduced into the press. The lower side boards rest upon the platen, and are held against the sides of the press-frame by props placed obliquely against them, the feet of the props resting in notches made in the floor. About one-third (more or less) of the length of the side beams of the press-frame, measuring from the upper end downward, incline outward, making the space inside of the frame widest at the top. This form of the box in some measure relieves it from the friction caused by the lateral expansion of the bale after being reduced in bulk about two-thirds of the amount it is required to compress it. The friction, after the bale has arrived at this point of compression, being so great in presses with parallel ends as to require considerable force to overcome it, the benefits of this mode of construction may be extended to the sides as well as the ends, if it should be deemed advisable. When the cotton has been compressed to the extent required, the props which hold up the side planks are knocked out and the sides removed. The bale is then roped, after which, in order to free it entirely from the press, one of the ends $b$ of the box, which is adjustable, is moved back by knocking the wedges $c$ out from behind it, when the frame is easily run up by turning back the screw, the expansion of the bale being almost sufficient for the purpose without aid from the attendants.

As the press-box moves between guides, instead of being stationary, as in common presses, it becomes necessary to have the adjustable end arranged in such a manner that it cannot easily be got out of place by either the ignorance or inadvertence of the attendant, in order to prevent it from catching under the beams I or the floor, and tearing them up when being raised or lowered by the screw, as would unavoidably happen if its proper adjustment depended upon the attention of those to whom this kind of work is usually assigned. I have accordingly placed this board between guides $i$, which allow it to move freely either toward or from the bale, but prevent it from moving laterally, which renders it impossible to place it wrong. The board is held up to its place by wedges $c$, which have shoulders formed upon them, that come into contact with a projection in the recess made for the purpose, and which arrests them in the proper place, and prevents their ends from being protruded beyond the sides of the frame, in which position they would get broken themselves, and perhaps break at the same time some other part of the press.

The operation of pressing cotton being so well and generally understood by all who have occasion to practice it, I do not deem a particular description of the process to be here necessary, as by using this machine it is changed in no other respect than in the superior facility and convenience with which it is performed.

Having thus described the construction and operation of my improved cotton-press, what I claim therein as new, and desire to secure by Letters Patent, is—

1. The combination of the movable end board, *b*, its guides *i*, and supporting-wedges *c* with the moving packing-box G and stationary platen F, substantially in the manner and for the purposes herein set forth.

2. Constructing the press-box with the upper part of its sides and ends slightly inclined outward, in the manner and for the purpose herein set forth.

THOMAS ASHCRAFT.

Witnesses:
T. R. AMES,
B. G. W. LINDSAY.